US010779910B2

United States Patent
Schnaitter et al.

(10) Patent No.: US 10,779,910 B2
(45) Date of Patent: Sep. 22, 2020

(54) ORTHODONTIC BRACKET AXIS INDICATOR

(71) Applicant: Ormco Corporation, Orange, CA (US)

(72) Inventors: Dwight P. Schnaitter, Salt Lake City, UT (US); Manfredo Anaya, Woodland Hills, CA (US); Vince Garcia, Chino Hills, CA (US)

(73) Assignee: Ormco Corporation, Orange, CA (US)

( * ) Notice: Subject to any disclaimer, the term of this patent is extended or adjusted under 35 U.S.C. 154(b) by 0 days.

(21) Appl. No.: 16/031,232

(22) Filed: Jul. 10, 2018

(65) Prior Publication Data

US 2019/0090986 A1 Mar. 28, 2019

Related U.S. Application Data

(60) Provisional application No. 62/562,791, filed on Sep. 25, 2017.

(51) Int. Cl.
*A61C 7/14* (2006.01)
*A61C 19/04* (2006.01)

(52) U.S. Cl.
CPC .............. *A61C 7/146* (2013.01); *A61C 19/04* (2013.01)

(58) Field of Classification Search
CPC ........... A61C 7/146; A61C 7/14; A61C 7/125; A61C 7/141; A61C 7/02; A61C 7/023;
(Continued)

(56) References Cited

U.S. PATENT DOCUMENTS 4,913,653 A * 4/1990 Bolliger .................. A61C 7/12
433/14
4,952,141 A 8/1990 Wool
(Continued)

FOREIGN PATENT DOCUMENTS

WO 1996028111 A1 9/1996
WO 2013028396 A1 2/2013

OTHER PUBLICATIONS

"Groove." Merriam-Webster.com Dictionary, Merriam-Webster, https://www.merriamwebster.com/dictionary/groove. Accessed Feb. 5, 2020. (Year: 2020).*
(Continued)

*Primary Examiner* — Sean M Michalski
*Assistant Examiner* — Shannel N Wright
(74) *Attorney, Agent, or Firm* — Wood Herron & Evans LLP

(57) ABSTRACT

An orthodontic bracket axis indicator for use with an orthodontic bracket including a long slot intersecting with an archwire slot having a base surface and first and second opposed slot surfaces extending from the base surface includes an insert having first and second elongate cross members having first and second top surfaces, respectively, and arranged generally perpendicular to each other such that, when viewed from above, the insert has a generally cruciform shape. First and second grooves extend along the first and second top surfaces of the first and second cross members, respectively, and are each configured to receive an orthodontic tool. The first cross member is configured to be received by the archwire slot and the second cross member is configured to be received by the long slot in order to provide an interference fit between the insert and the orthodontic bracket.

14 Claims, 9 Drawing Sheets

(58) Field of Classification Search
CPC .. A61C 7/12; A61C 7/34; A61C 19/04; A61C 7/28–287
USPC .......................................................... 433/3
See application file for complete search history.

(56) References Cited

U.S. PATENT DOCUMENTS

| | | | |
|---|---|---|---|
| 5,354,199 A | 10/1994 | Jacobs et al. | |
| 5,542,842 A * | 8/1996 | Andreiko ................. | A61C 7/00 433/3 |
| 5,607,299 A | 3/1997 | Nicholson | |
| 5,692,896 A * | 12/1997 | Pospisil ................... | A61C 7/14 206/369 |
| 7,726,470 B2 | 6/2010 | Cinader, Jr. et al. | |
| 7,841,464 B2 | 11/2010 | Cinader, Jr. et al. | |
| 2005/0277082 A1* | 12/2005 | Christoff ................ | A61C 7/141 433/8 |
| 2006/0172248 A1* | 8/2006 | Sernetz .................. | A61C 7/282 433/8 |
| 2009/0004619 A1* | 1/2009 | Oda ......................... | A61C 7/14 433/24 |
| 2010/0178629 A1* | 7/2010 | Oda ....................... | A61C 7/125 433/14 |
| 2013/0230817 A1* | 9/2013 | Kabbani ................. | A61C 7/14 433/3 |
| 2014/0212827 A1* | 7/2014 | Tzou ...................... | A61C 7/146 433/8 |

OTHER PUBLICATIONS

"Depression." Merriam-Webster.com Dictionary, Merriam-Webster, https://www.merriamwebster.com/dictionary/depression. Accessed Feb. 5, 2020. (Year: 2020).*

* cited by examiner

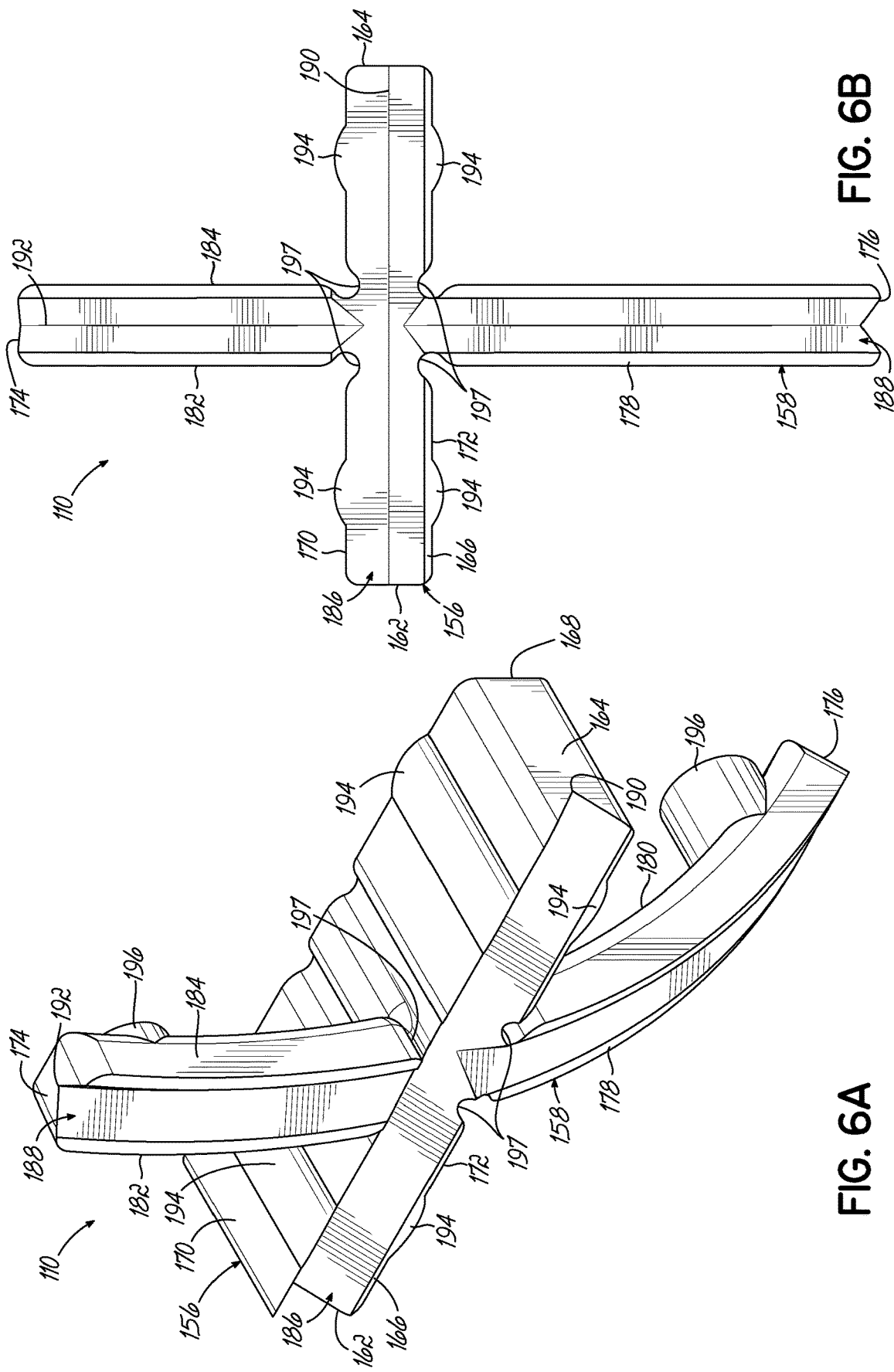

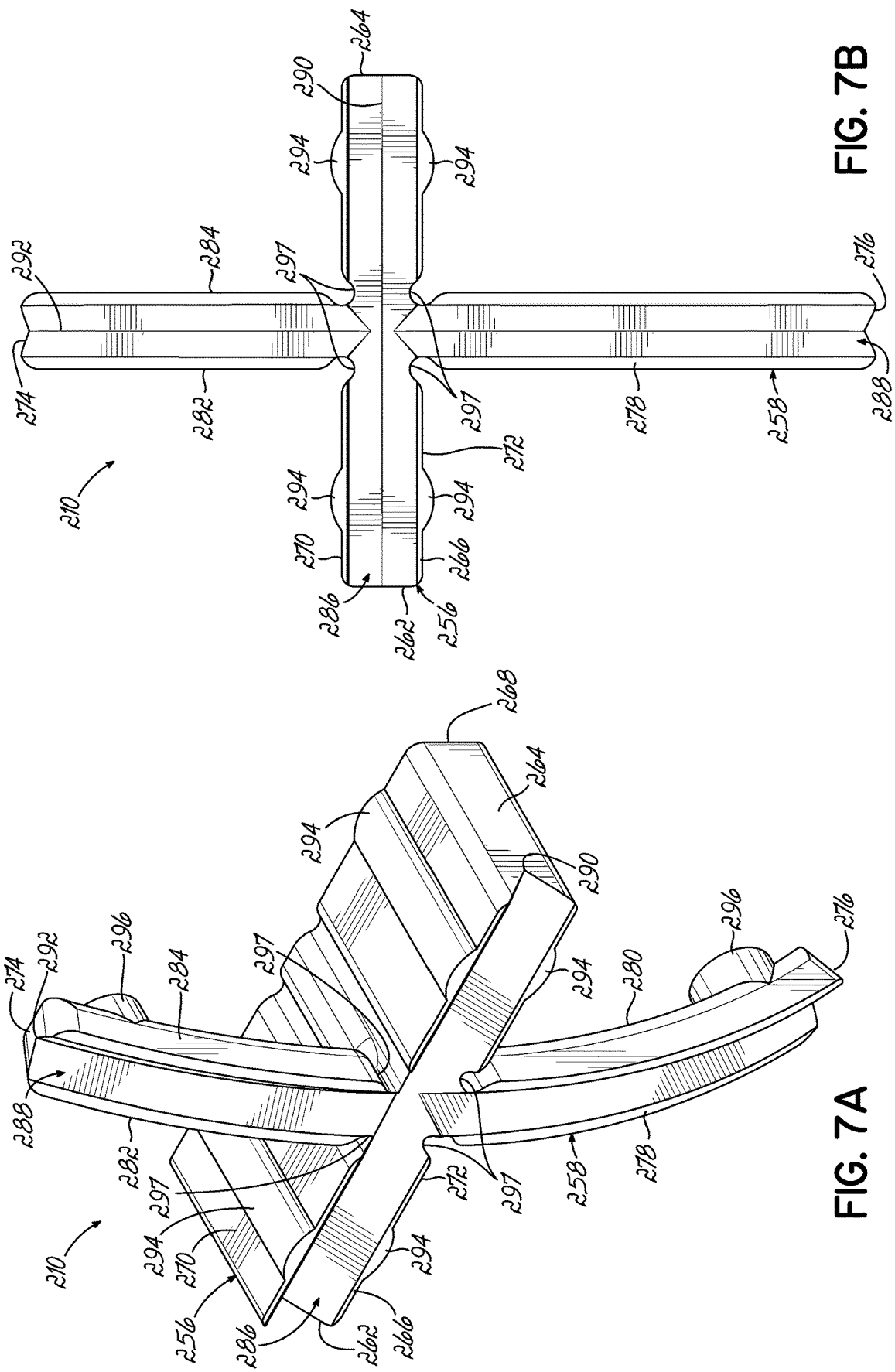

ORTHODONTIC BRACKET AXIS INDICATOR

CROSS REFERENCE TO RELATED APPLICATION

This application claims the benefit of U.S. Provisional Patent Application Ser. No. 62/562,791 filed on Sep. 25, 2017, the disclosure of which is expressly incorporated by reference herein in its entirety

TECHNICAL FIELD

The present invention relates generally to orthodontic brackets and, more particularly, to an orthodontic bracket axis indicator for assisting a clinician in aligning an orthodontic bracket on a tooth.

BACKGROUND

Orthodontic brackets represent a principal component of corrective orthodontic treatments devoted to improving a patient's occlusion. In conventional orthodontic treatments, an orthodontist, assistant, or other clinician affixes brackets to the patient's teeth and engages an archwire into a slot of each bracket. Orthodontists typically insert a scaler, such as a sickle scaler, into the archwire slot of each bracket to control both vertical and horizontal placement of the bracket when mounting the bracket to the patient's tooth. In this regard, certain brackets (e.g., ceramic brackets) may include visual reference marks and/or other indicia visible from a labial side of the bracket for assisting the orthodontist in properly aligning the bracket with the patient's tooth. For example, such indicia may be provided in the archwire slot. However, the insertion of the sickle scaler into the archwire slot at least partially blocks such indicia from the orthodontist's sight, thereby greatly reducing the effectiveness of the indicia. Moreover, the clinician may be required to push the sickle scaler against the base of the archwire slot while the bonding material sets. In some cases, the application of such force against the base surface of the archwire slot may scratch, chip, nick, or otherwise create surface defects in the bracket. These surface defects may represent local initiation sites for the ultimate fracture of the bracket.

One known method of providing a visual aid for aligning a bracket on a tooth is to provide removable water soluble paint on both the archwire slot and the long slot (e.g., between the tie wings) of the bracket. Such paint is typically a vibrant color, such as blue, so that it may be readily visible. Once the bracket has been mounted to the tooth, the paint is intended to be removed by the patient, using a tooth brush and tooth paste. However, it is often very difficult to brush the paint out of the archwire slot and/or the long slot. This is due, for example, to the archwire residing in the archwire slot, thereby blocking the patient's tooth brush from reaching all of the paint on the archwire slot. This experience can be frustrating for the patient, who may need to brush the paint out of as many as 20 brackets. In many cases, the patient is unable to completely remove the paint from each of the brackets, and must endure many months of having a noticeable, colored tint on their brackets. In cases where the patient has selected clear (e.g., ceramic) brackets for the purpose of minimizing the visual impact of the brackets on the patient's teeth, this experience can be particularly dissatisfying.

Other known methods involving paint can lead to similarly undesirable results. For example, in cases where indirect bonding is used to mount the bracket to the tooth, paint may leach out of the indirect matrix and stain the adhesive when the model and matrix tray are being soaked in water to release from the model. This may require the orthodontist to remove the brackets and grind off the stained adhesive before repeating the process. Moreover, methods involving paint inevitably result in the paint being disposed of (e.g., removed by grinding or washing with water and/or chemicals), and thus are not conducive to reusability.

Therefore, there is a need for an improved bracket axis indicator for assisting a clinician in aligning an orthodontic bracket on a tooth.

SUMMARY

To address these and other shortcoming, an orthodontic bracket axis indicator for use with an orthodontic bracket is provided. The orthodontic bracket includes a long slot intersecting with an archwire slot having a base surface and first and second opposed slot surfaces extending from the base surface. The indicator includes an insert having first and second elongate cross members having first and second top surfaces, respectively, and arranged generally perpendicular to each other such that, when viewed from above, the insert has a generally cruciform shape. First and second grooves extend along the first and second top surfaces of the first and second cross members, respectively. The first and second grooves are each configured to receive an orthodontic tool. The first cross member is configured to be received by the archwire slot and the second cross member is configured to be received by the long slot in order to provide an interference fit between the insert and the orthodontic bracket.

At least one of the first or second grooves may be generally V-shaped. In one embodiment, both of the first and second grooves are generally V-shaped. The first cross member is configured to be spaced apart from the base surface of the archwire slot by a gap when received by the archwire slot. The gap may be sized to prevent the first cross member from contacting the base surface of the archwire slot when the orthodontic tool is received by one of the first or second grooves and applies a force thereto in a direction toward the base surface. Furthermore, the gap may be sized to receive the orthodontic tool such that the orthodontic tool may apply a force to the first cross member in a direction away from the base surface in order to remove the insert from the orthodontic bracket. The second cross member may be configured to operatively engage a surface of the orthodontic bracket in order to provide the gap. More particularly, the second cross member may be configured to operatively engage a surface of the long slot in order to provide the gap.

The first cross member includes first and second side surfaces opposing the first and second slot surfaces of the archwire slot when received by the archwire slot. Additionally, the first cross member includes at least one protrusion extending from at least one of the first or second side surfaces for providing an interference fit between the first cross member and the archwire slot. The second cross member includes at least one bottom surface opposite the second top surface. Additionally, the second cross member includes at least one protrusion extending from the at least one bottom surface for providing an interference fit between the second cross member and a side surface of the orthodontic bracket.

In one embodiment, the insert may include at least one of an edible material or a dissolvable material.

A method of aligning an orthodontic bracket on a tooth is also disclosed. The orthodontic bracket includes a long slot intersecting with an archwire slot having a base surface and first and second opposed slot surfaces extending from the base surface. The method includes removably securing an insert to the orthodontic bracket, wherein a first cross member of the insert is received by the archwire slot and a second cross member of the insert is received by the long slot to provide an interference fit between the insert and the orthodontic bracket; selecting a first selected groove from first and second grooves provided on top surfaces of the first and second cross members, respectively; engaging a portion of an orthodontic tool with the first selected groove; manipulating the orthodontic tool to adjust an orientation of the orthodontic bracket on the tooth via the engagement of the portion of the orthodontic tool with the first selected groove; adhering the orthodontic bracket to the tooth; and removing the insert from the orthodontic bracket.

In one embodiment, the step of adhering the orthodontic bracket to the tooth includes applying a force to the insert in the direction of the base surface of the archwire slot, wherein a gap is provided between the first cross member and the base surface to prevent the first cross member from contacting the base surface. In one embodiment, the step of removing the insert from the orthodontic bracket includes inserting apportion of the orthodontic tool into a gap provided between the first cross member and the base surface of the archwire slot and applying a force to the insert in a direction away from the base surface via the orthodontic tool. In one embodiment, the step of manipulating the orthodontic tool includes visually assessing at least one of an orientation or a position of at least one of the first and second cross members relative to the tooth.

The method may further include, prior to the step of adhering the orthodontic bracket to the tooth, selecting a second selected groove from the first and second grooves; engaging a portion of an orthodontic tool with the second selected groove; and manipulating the orthodontic tool to adjust an orientation of the orthodontic bracket on the tooth via the engagement of the portion of the orthodontic tool with the second selected groove. Furthermore, the method may further include removably securing the insert to a second orthodontic bracket and repeating the steps above to secure another orthodontic bracket to a tooth.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

FIG. 6A is a perspective view of an alternative exemplary orthodontic bracket axis indicator, in accordance with an aspect of the invention.

FIG. 6B is a top elevation view of the orthodontic bracket axis indicator of FIG. 6A.

FIG. 7A is a perspective view of an alternative exemplary orthodontic bracket axis indicator, in accordance with an aspect of the invention.

FIG. 7B is a top elevation view of the orthodontic bracket axis indicator of FIG. 7A.

DETAILED DESCRIPTION

Figure 1:
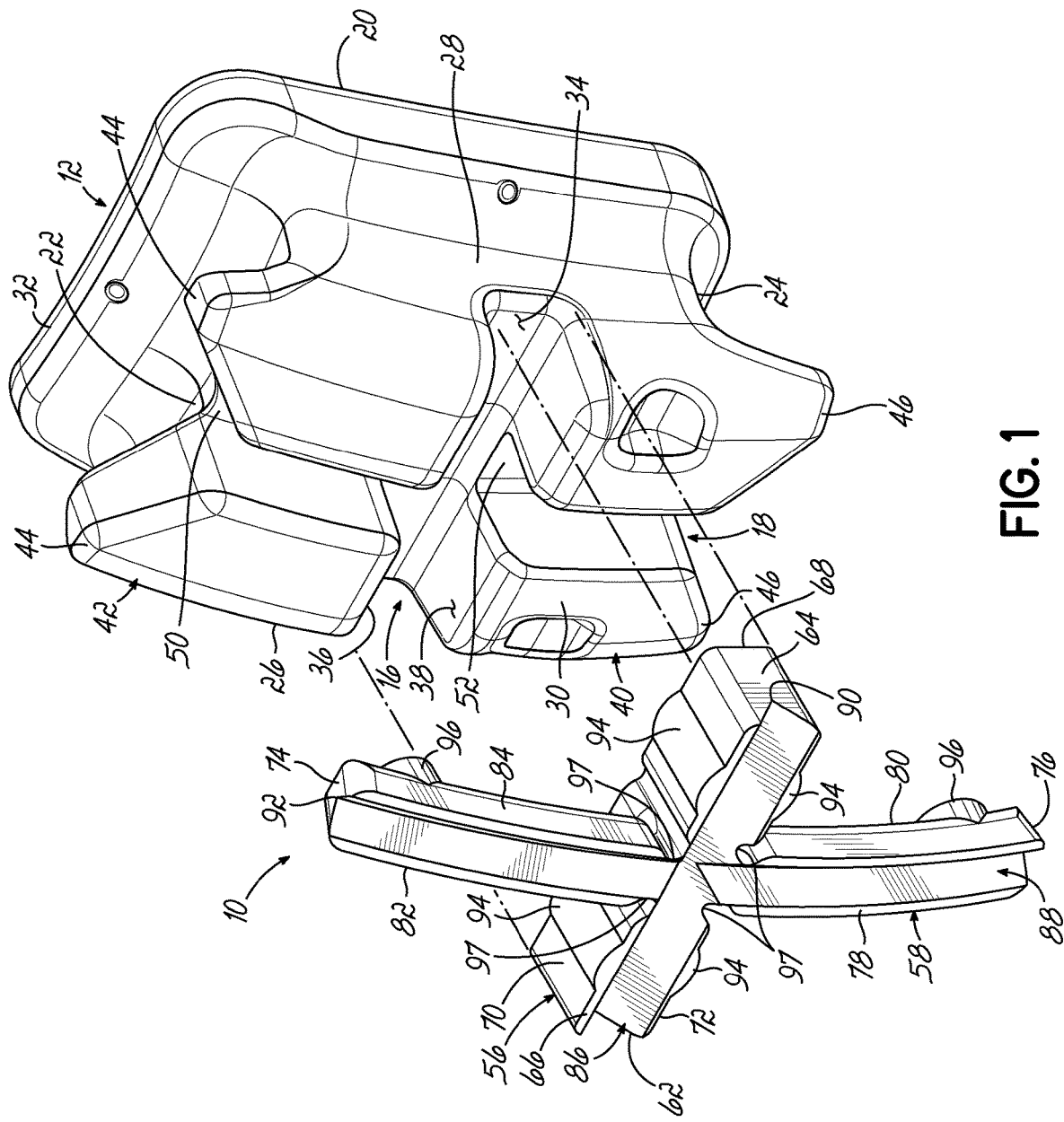
FIG. 1 is a perspective view of an exemplary orthodontic bracket axis indicator aligned with the archwire slot and long slot of an orthodontic bracket, in accordance with an aspect of the invention.

Referring now to FIGS. 1-5B, an exemplary orthodontic bracket axis indicator or insert 10 is provided for assisting a clinician in aligning an orthodontic bracket 12 on a patient's tooth T with an orthodontic tool such as a sickle scaler 14, the bracket 12 having an archwire slot 16 and a long slot 18. The insert 10 is removably securable to the orthodontic bracket 12, and thus avoids the need for messy paints and may allow for reusability with multiple brackets. The insert 10 may remain readily visible while the clinician adjusts the position and/or orientation of the orthodontic bracket 12 on the patient's tooth T, and may protect the orthodontic bracket 12 from being damaged during this process. The features of the insert 10 are set forth in further detail below to clarify each of these functional advantages and other benefits provided in this disclosure.

The illustrated orthodontic bracket 12, unless otherwise indicated, is described herein using a reference frame attached to a labial surface of a tooth on the lower jaw of the patient's mouth. Consequently, terms such as labial, lingual, mesial, distal, occlusal, and gingival used to describe the bracket 12 and/or insert 10 are relative to the chosen reference frame. The embodiments of the invention, however, are not limited to the chosen reference frame and descriptive terms, as the orthodontic bracket 12, and thus the insert 10, may be used on other teeth and in other orientations within the oral cavity. For example, the bracket may also be coupled to the labial surface of a tooth on the maxilla or coupled to the lingual surface of the tooth. Those of ordinary skill in the art will recognize that the descriptive terms used herein may not directly apply when there is a change in reference frame. Nevertheless, embodiments of the invention are intended to be independent of location and orientation within the oral cavity and the relative terms used to describe embodiments of the invention are to merely provide a clear description of the embodiments in the drawings. As such, the relative terms labial, lingual, mesial, distal, occlusal, and gingival are in no way limiting embodiments of the invention to a particular location or orientation.

When mounted to the labial surface of a tooth T carried on the patient's lower jaw, the bracket 12 has a lingual side 20, an occlusal side 22, a gingival side 24, a mesial side 26, a distal side 28, and a labial side 30. The lingual side 20 of the bracket 12 is configured to be secured to the tooth in any conventional manner, such as by an appropriate orthodontic cement or adhesive or by a band around an adjacent tooth. The lingual side 20 may be provided with a pad 32 defining a bonding base that is secured to the surface of the tooth. The pad 32 may be coupled to the bracket 12 as a separate piece or element, or alternatively, the pad 32 may be integrally formed with the bracket 12.

It will be appreciated that the bracket 12 may be made of a metal or metal alloy or ceramic material by any one of a number of commercially available processes including, and by way of example and not limitation, metal injection molding (MIM), ceramic injection molding (CIM), other injection molding, or casting technique. Aspects of the invention, however, may be particularly useful when used in conjunction with ceramic brackets.

As shown, the bracket 12 includes a base surface 34 and a pair of opposed slot surfaces 36, 38 projecting labially from the base surface 34 that collectively define the archwire slot 16, such that the archwire slot 16 extends in a mesial-distal direction from mesial side 26 to distal side 28 along a length of the archwire slot 16 and is bounded by the slot surfaces 36, 38 defining a width of the archwire slot 16. In one embodiment, the slot surfaces 36, 38 and base surface 34 are substantially encapsulated or embedded within the material of the bracket 12. However, it will be appreciated that one or more of the slot surfaces 34, 36, and 38 may be defined by an insert (not shown) or liner (not shown) to enhance the wear characteristics of the archwire slot 16 or for other reasons. The archwire slot 16 of the bracket 12 may be designed to receive an orthodontic archwire (not shown) in any suitable manner. In any event, the archwire slot 16 defines a first axis of the bracket 12 which, when properly aligned with the patient's tooth T, may be substantially horizontal. Thus, this axis may be referred to as the horizontal axis of the bracket 12.

The bracket 12 further includes a gingival body portion 40 and an occlusal body portion 42. As shown, the body portions 40, 42 are separated by the archwire slot 16 and may define one or more of the slot surfaces 34, 36, 38, respectively, as described above. In the exemplary embodiment depicted, the body portions 40, 42 may include opposing occlusal and gingival tie wings 44, 46, respectively, for receiving one or more ligatures (not shown), as is known in the art. The occlusal tie wings 44 are separated from each other by an occlusal base surface 50 and the gingival tie wings 46 are separated from each other by a gingival base surface 52. The occlusal tie wings 44, gingival tie wings 46, occlusal base surface 50, and gingival base surface 52 collectively define, at least in part, the long slot 18, such that the long slot 18 extends in an occlusal-gingival direction from occlusal side 22 to gingival side 24 along a length (or arclength) of the long slot 18 and is at least partially bounded by the tie wings 44, 46 defining a width of the long slot 18. As shown, the long slot 18 intersects the archwire slot 16 and opens to each of the occlusal and gingival sides 22, 24 of the bracket 12. It will be appreciated that the occlusal and/or gingival base surfaces 50, 52 of the long slot 18 may be contoured as shown or may be flat and/or inclined, as is known in the art. In any event, the long slot 18 defines a second axis of the bracket 12 which, when properly aligned with the patient's tooth T, may be substantially vertical. Thus, this axis may be referred to as the vertical axis of the bracket 12.

As noted above, the insert 10 is configured to be removably secured to the bracket 12 through cooperation with one or both of the archwire slot 16 and long slot 18. To this end, the insert 10 includes first and second elongate cross members 56, 58 arranged generally perpendicular to each other at or near their respective midpoints such that, when viewed from above, the insert 10 has a generally cruciform shape. The first elongate cross member 56 extends between first and second ends 62, 64 and has a first top surface 66, a first bottom surface 68, and first and second side surfaces 70, 72. The first and second ends 62, 64 may be spaced apart from each other by a distance approximately equal to the length of the archwire slot 16, and the first and second side surfaces 70, 72 may be spaced apart from each other by a distance substantially equal to or slightly less than the width of the archwire slot 16 such that the first elongate cross member 56 may be received therein and aligned with, and therefore indicative of, the horizontal axis of the bracket 12. In this regard, the first elongate cross member 56 may be vibrantly colored so as to be readily visible to the clinician. It will be appreciated that the sizing of the first cross member 56 relative to the archwire slot 16 may vary, as discussed below.

The second cross member 58 extends between third and fourth ends 74, 76 and has a second top surface 78, a second bottom surface 80, and third and fourth side surfaces 82, 84. In the embodiment shown, the first cross member 56 interrupts at least the second bottom surface 80 and third and fourth side surfaces 82, 84 of the second cross member 58 at the intersection between the first and second cross members 56, 58. In any event, the third and fourth ends 74, 76 may be spaced apart from each other by a distance slightly greater than the length of the long slot 18, and the third and fourth side surfaces 82, 84 may be spaced apart from each other by a distance approximately equal to the width of the long slot 18 such that the second elongate cross member 58 may be received therein and aligned with, and therefore indicative of, the vertical axis of the bracket 12. In this regard, the second elongate cross member 58 may be vibrantly colored so as to be readily visible to the clinician and may be the same color as or a different color from that of the first elongate cross member 56. It will be appreciated that the sizing of the second cross member 58 relative to the long slot may vary, as discussed below. As shown, the second cross member 58 may be at least slightly curved such that the second bottom surface 80 may complement the contoured occlusal and/or gingival base surfaces 50, 52 of the long slot 18.

Figure 2:
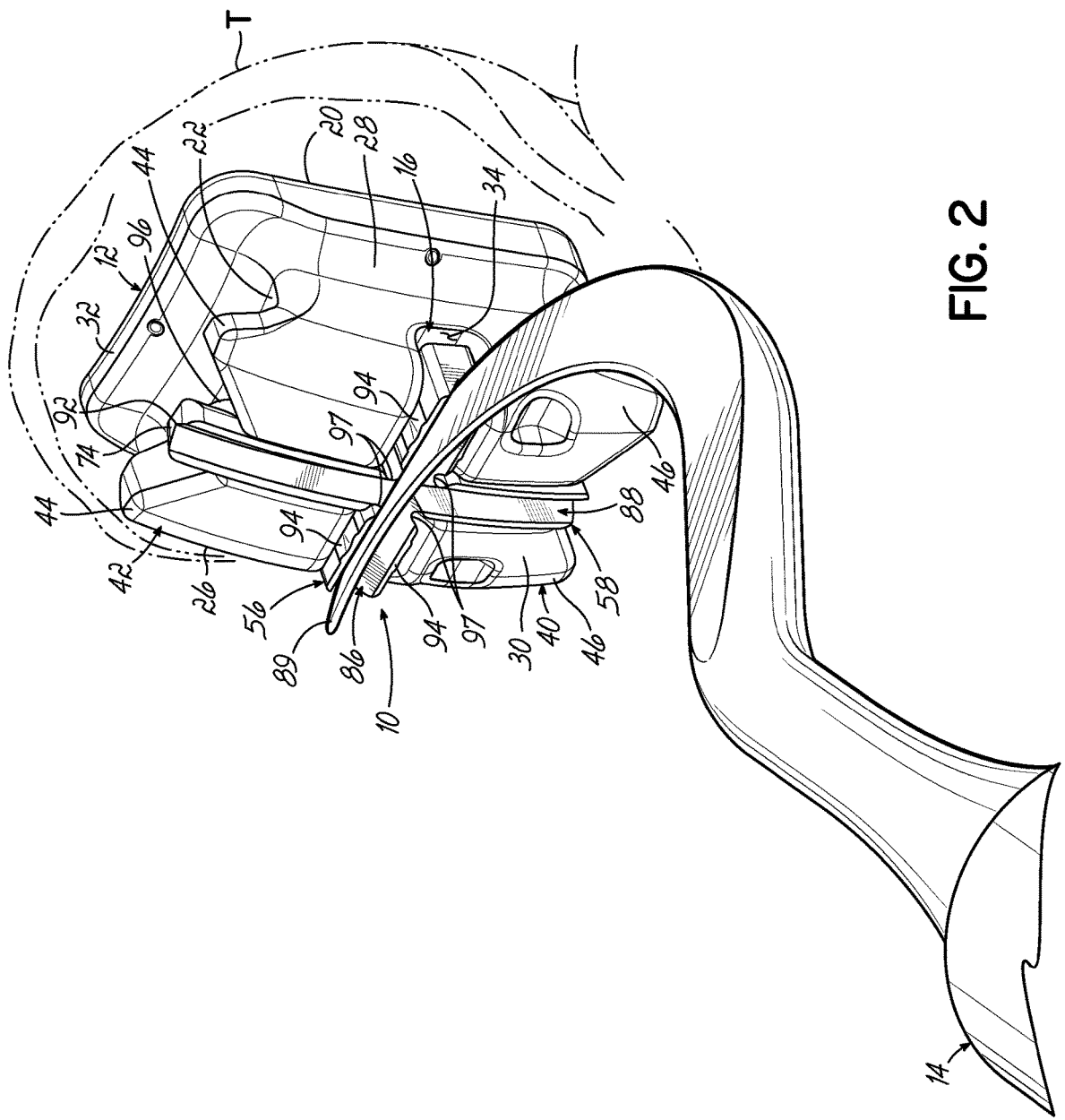
FIG. 2 is a perspective view of the orthodontic bracket axis indicator of FIG. 1 releasably secured to the orthodontic bracket, showing a use of an orthodontic tool to align the orthodontic bracket on a tooth.
Figure 3:
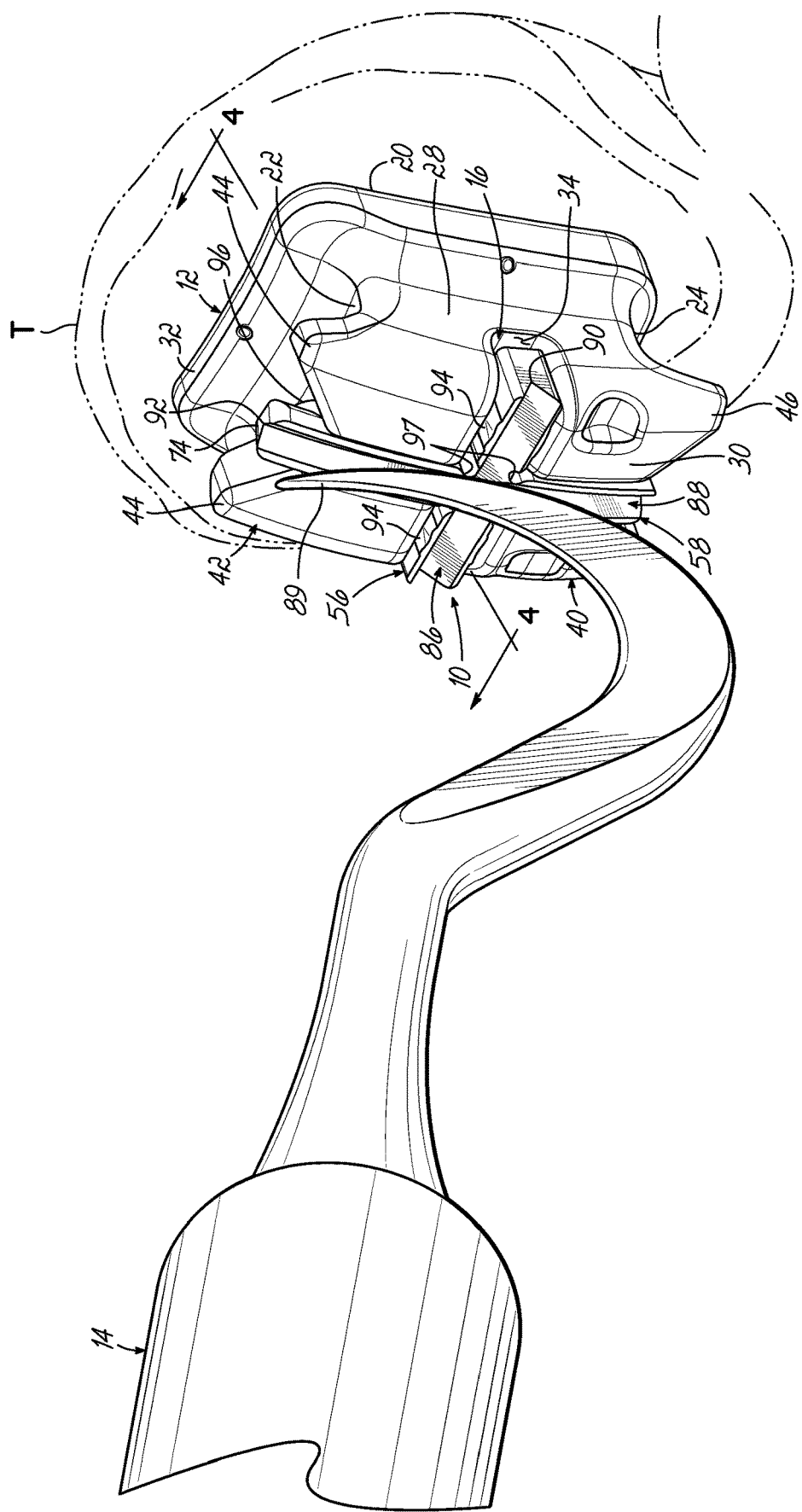
FIG. 3 is a perspective view similar to FIG. 2, showing an alternative use of the orthodontic tool to align the orthodontic bracket on the tooth.

First and second grooves 86, 88 extend along the first and second top surfaces 66, 78 of the first and second cross members 56, 58, respectively, and are each configured to receive a portion of an orthodontic tool such as a hook portion 89 of the sickle scaler 14, as shown in FIGS. 2 and 3. In the embodiment shown, the first and second grooves 86, 88 are each generally V-shaped. More particularly, the first groove 86 extends from the first top surface 66 into the first cross member 56 to a first apex 90, and the second groove 88 extends from the second top surface 78 into the second cross member 58 to a second apex 92. The first and second grooves 86, 88 may extend along substantially the entire lengths of the respective cross members 56, 58 and may have generally constant depths, as shown. Alternatively, the first and second grooves 86, 88 may extend only partially along the lengths of the respective cross members 56, 58, and/or the depths of the first and second grooves 86, 88 may vary. For example, the first and/or second grooves 86, 88 may be tapered.

Figure 4:
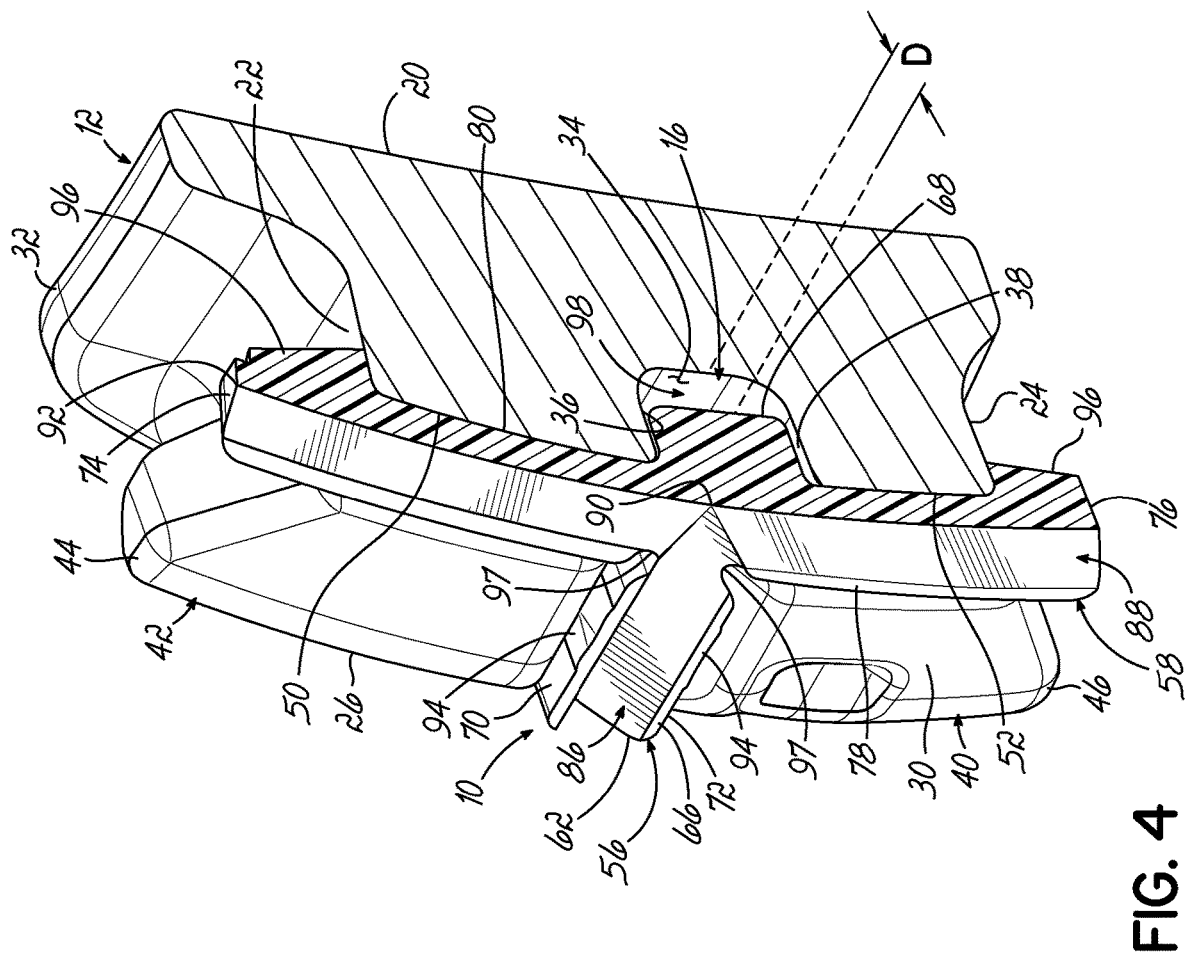
FIG. 4 is a cross sectional view of the orthodontic bracket axis indicator releasably secured to the orthodontic bracket, taken along section line 4-4 in FIG. 3.
Figure 5B:
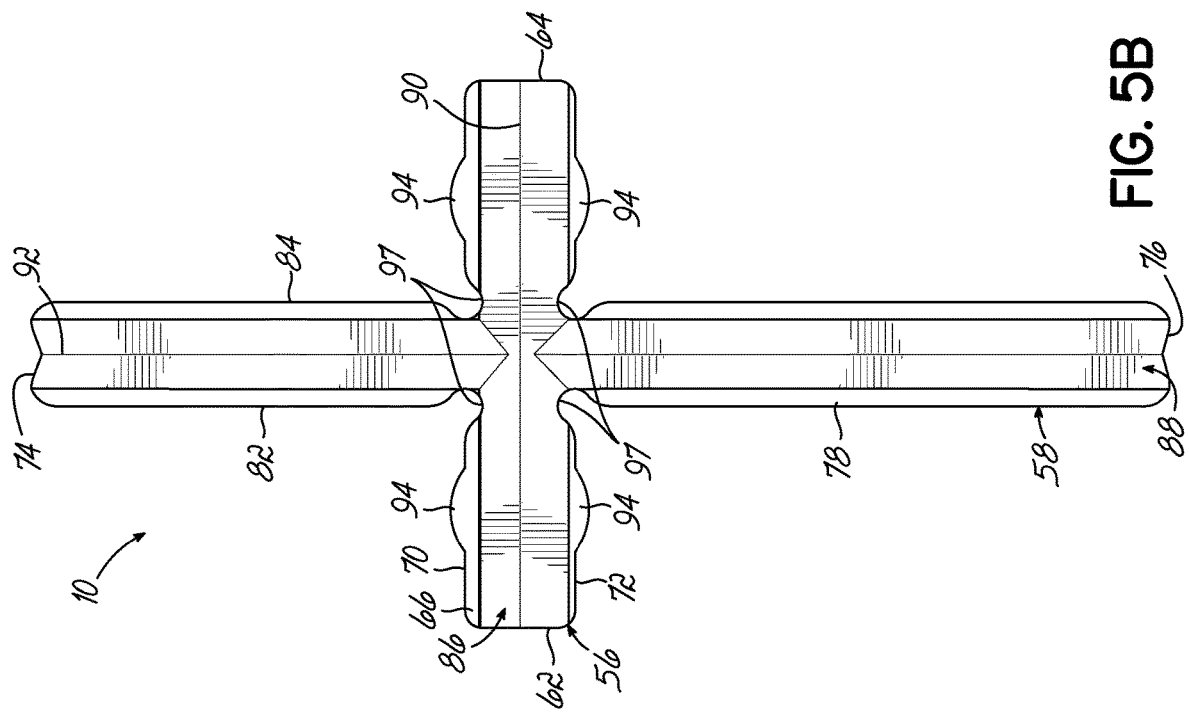
FIG. 5B is a top elevation view of the orthodontic bracket axis indicator of FIG. 1.
Figure 5A:
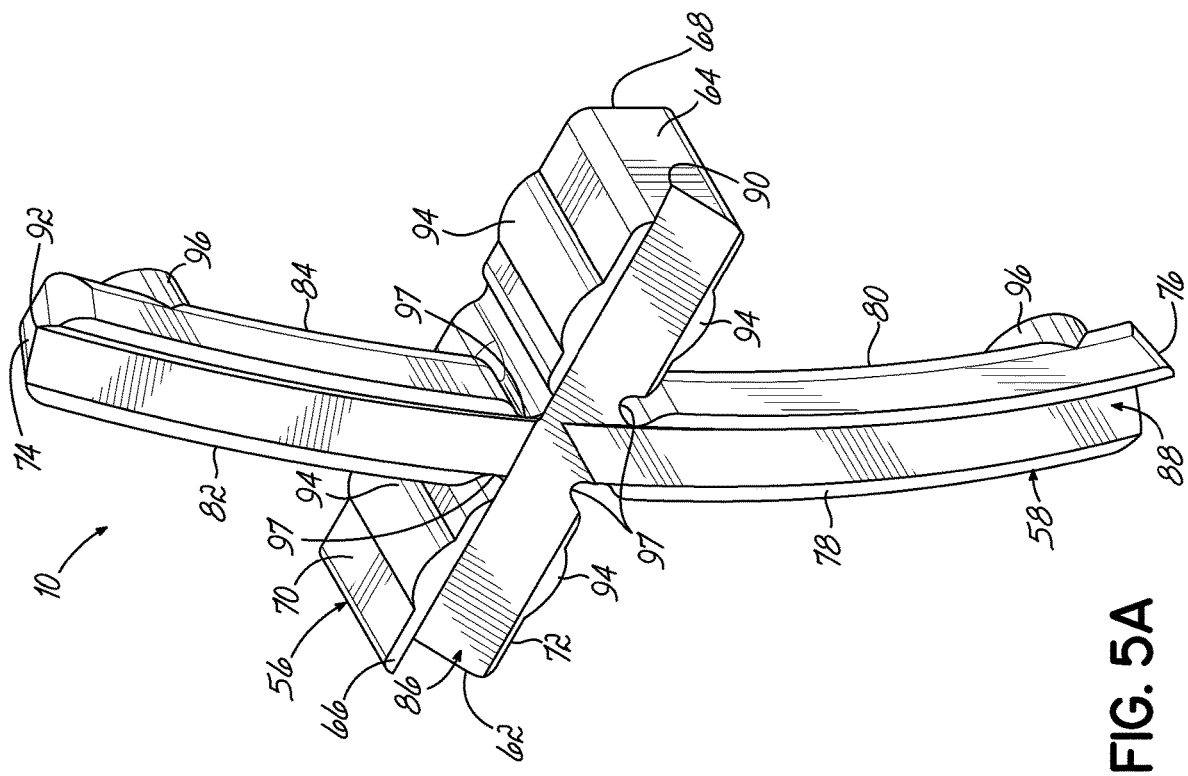
FIG. 5A is a perspective view of the orthodontic bracket axis indicator of FIG. 1.
Figure 8B:
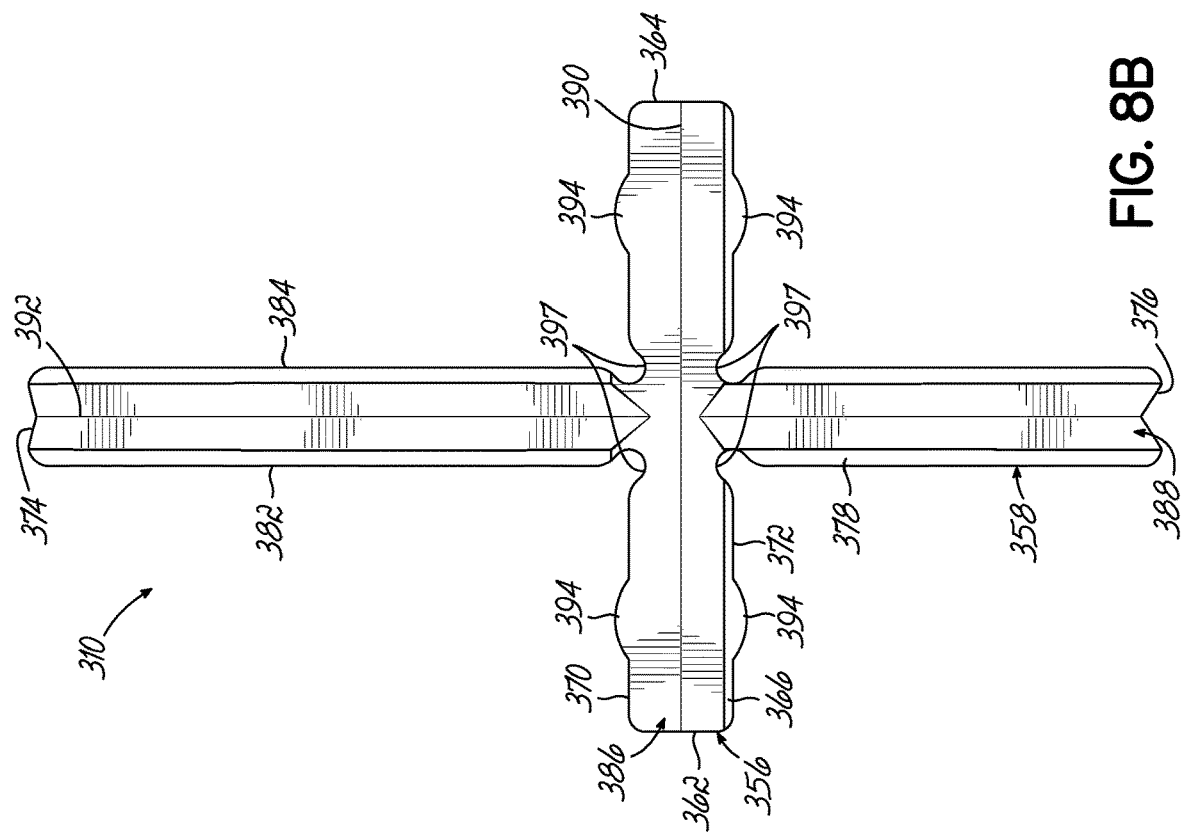
FIG. 8B is a top elevation view of the orthodontic bracket axis indicator of FIG. 8A.
Figure 8A:
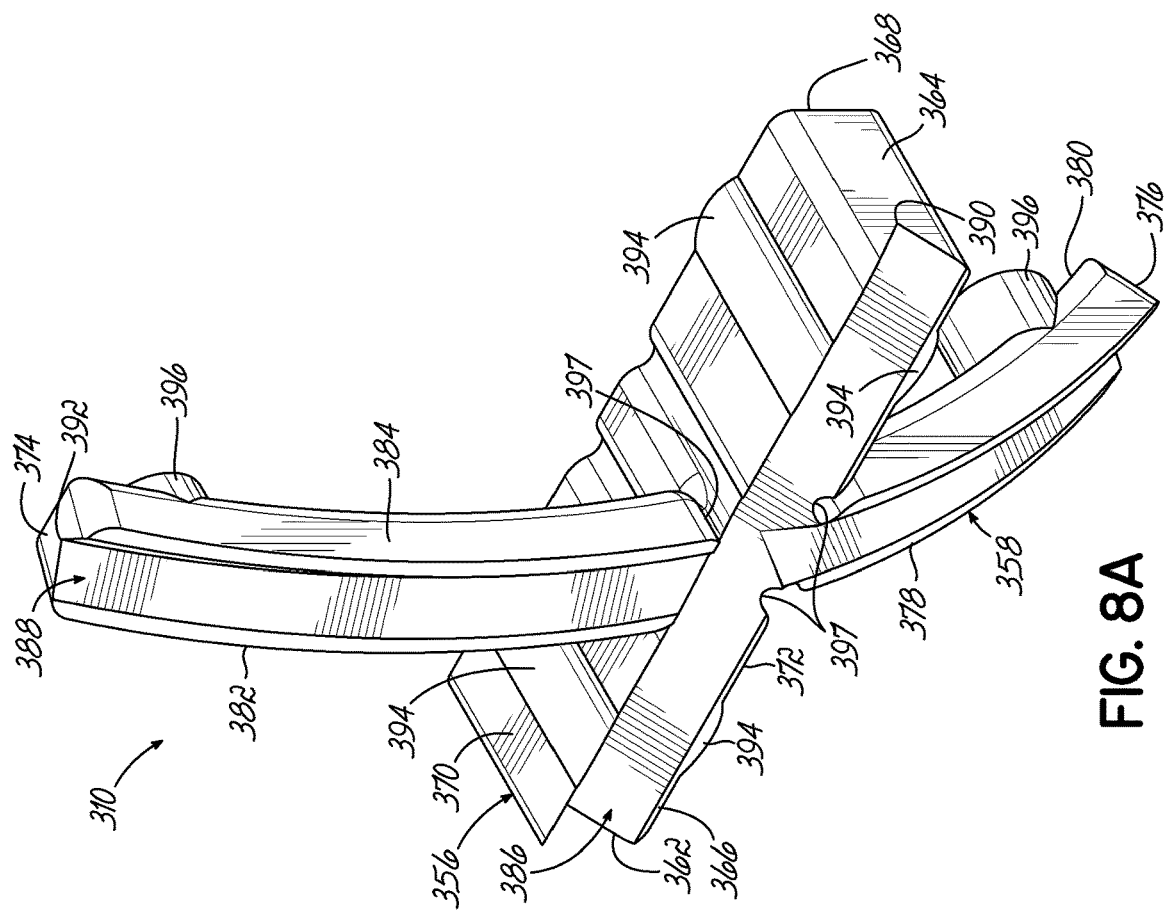
FIG. 8A is a perspective view of an alternative exemplary orthodontic bracket axis indicator, in accordance with an aspect of the invention.

As shown, the first cross member 56 is configured to be received by the archwire slot 16 of the orthodontic bracket 12 and the second cross member 58 is configured to be received by the long slot 18 of the orthodontic bracket 12 in order to provide at least one interference fit between the insert 10 and the orthodontic bracket 12 to thereby removably secure the insert 10 to the bracket 12. To that end, the first cross member 56 includes a plurality of first protrusions 94 extending from the first and second side surfaces 70, 72 for providing an interference fit between the first cross member 56 and the archwire slot 16. More particularly, the first protrusions 94 may define thickened portions of the first cross member 56 which are slightly greater that the width of the archwire slot 16. For example, the first protrusions 94 may be arranged in oppositely disposed pairs extending from the first and second side surfaces 70, 72 as shown. The first protrusions 94 may be constructed of a flexible or semi-flexible material, such that the first protrusions 94 may be at least slightly deformed by the opposed slot surfaces 36, 38 to thereby grip the opposed slot surfaces 36, 38, as shown in FIGS. 2-4. For example, the first protrusions 94 may be constructed of a polypropylene or polyurethane material. While four generally rounded (in an undeformed state) first protrusions 94 are shown, it will be appreciated that any suitable number of first protrusions 94 having any suitable geometries may be used.

In the embodiment shown, the second cross member 58 includes a plurality of second protrusions 96 extending from the second bottom surface 80 for providing an interference fit between the second cross member 58 and side surfaces of the orthodontic bracket 12, such as the occlusal and gingival sides 22, 24 of the bracket 12 (FIG. 4). It will be appreciated that first protrusions 94 may be sufficient for providing an interference fit between the first cross member 56 and the archwire slot 16 and securing the insert 10 to the orthodontic bracket 12. The inclusion of additional interference fit providing members such as second protrusions 96 is in accordance with additional arrangements of the present invention. In accordance with such additional arrangements, second protrusions 96 may provide an added degree of securing insert 10 to bracket 12 by providing an interference fit between the second cross member 58 and the side surfaces of the bracket 12. In this regard, the second protrusions 96 may be provided at or near the third and fourth ends 74, 76 of the insert 10, and may be spaced apart from each other by a distance (or arclength) approximately equal to the length (or arclength) of the long slot 18. Similar to the first protrusions 94, the second protrusions 96 may be constructed of a flexible or semi-flexible material and may be deformable upon insertion of the insert 10. For example, the second protrusions 96 may be constructed of a polypropylene or polyurethane material. While two generally cylindrical (in an undeformed state) second protrusions 96 are shown, it will be appreciated that any suitable number of second protrusions 96 having any suitable geometries may be used.

As shown in FIG. 1, for example, the insert 10 may include reliefs 97 provided at or near the intersecting mesial and distal surfaces of the vertical axis and the occlusal and gingival surfaces of the horizontal axis. For example, the illustrated insert 10 includes reliefs 97 at the intersections of the first side surface 70 and the third side surface 82, the first side surface 70 and the fourth side surface 84, the second side surface 72 and the third side surface 82, and the second side surface 72 and the fourth side surface 84. In the embodiment shown, the reliefs 97 are rounded, but may take other forms. The reliefs 97 may provide additional flexibility to the vertical and/or horizontal axis of the insert 10 thereby allowing the insert 10 to conform to a wide range of bracket angulations.

In one embodiment, the cross members 56, 58 and protrusions 94, 96 may be integrally formed together as a unitary piece. For example, the insert 10 may be constructed of injection molded polypropylene or polyurethane having a hardness of between approximately 70 and approximately 85 on the durometer scale.

Although the first protrusions 94 are illustrated on the first and second side surfaces 70, 72 and the second protrusions 96 are illustrated on the second bottom surface 80, it will be appreciated that any suitable types of protrusions may be arranged on any surfaces of the insert 10 to provide an interference fit between the insert 10 and the bracket 12, such that the insert 10 may be removably secured to the orthodontic bracket 12, without departing from the scope of the invention. Alternatively, the widths of the first and/or second cross members 56, 58 may be sized relative to the respective slots 16, 18 to provide such an interference fit, such that the protrusions 94, 96 may be eliminated.

As shown in FIG. 4, the first cross member 56 is configured to be spaced apart from the base surface 34 of the archwire slot 16 by a distance D to define a gap 98 when received by the archwire slot 16. For example, the second bottom surface 80 of the second cross member 58 may be configured to operatively engage the occlusal and/or gingival base surfaces 50, 52 of the long slot 18 so as to prevent the first bottom surface 68 of the first cross member 56 from contacting the base surface 34 of the archwire slot 16, in order to provide the gap 98. In this regard, a distance between the first and second bottom surfaces 68, 80 at the intersection of the first and second cross members 56, 58 may be less than a depth of the archwire slot 16. In one embodiment, the gap 98 may be sized to prevent the first bottom surface 68 from contacting the base surface 34 or "bottoming out" when the scaler 14 applies a force to the insert 10 via the first and/or second grooves 86, 88 in a direction toward the base surface 34. For example, in one embodiment the distance D defining the gap 98 may be a minimum of 0.005 inches. Thus, the gap 98 may prevent the force of the scaler 14 from impacting upon the base surface 34, and may thereby prevent the scaler 14 from creating surface defects in the base surface 34 or otherwise damaging the orthodontic bracket 12.

In one embodiment, the gap 98 may be sized to receive a portion of an orthodontic tool, such as the hook portion 89 of the scaler 14 such that the scaler 14 may be used to apply a force to the first bottom surface 68 of the first cross member 56 in a direction away from the base surface 34. In this manner, the gap 98 may assist in the removal of the insert 10 from the orthodontic bracket 12. In addition or alternatively, the insert 10 may be constructed of an edible material and/or a dissolvable material which may break down upon reacting with the patient's saliva, for example, such that manual removal of the insert 10 from the bracket 12 may not be required. Such a construction may also provide patient safety in the event that the insert 10 is accidentally swallowed by the patient, such as during removal of the insert 10 from the bracket 12. For example, the insert may be constructed of a sugar based material, such as an edible ink and/or an edible paper.

In one embodiment, a method of aligning the orthodontic bracket 12 on the patient's tooth T includes removably securing the insert 10 to the orthodontic bracket 12, such that the first cross member 56 is received by the archwire slot 16 and the second cross member 58 is received by the long slot 18 to provide an interference fit between the insert 10 and the bracket 12. The hook portion 89 of the scaler 14 is then engaged with the first groove 86 (FIG. 2) and/or second groove 88 (FIG. 3). For example, the hook portion 89 may at least partially bind or be at least partially seated in either groove 86, 88 at or near the apex 90, 92 thereof. With the hook portion 89 so engaged, the scaler 14 may be manipulated to adjust the orientation and/or position of the orthodontic bracket 12 relative to the tooth T via the engagement of the hook portion 89 with the groove 86, 88. For example, rotating the scaler 14 may rotate the bracket 12 on the tooth T, and translating the scaler 14 may translate the bracket 12 on the tooth T. At any time during the alignment of the bracket 12, the clinician may visually assess the orientation and/or position of the first and second cross members 56, 58 relative to the tooth T. In this regard, the first cross member 56 may be substantially aligned with, and therefore indicative of, the horizontal axis of the bracket 12, and the second cross member 58 may be substantially aligned with, and therefore indicative of, the vertical axis of the bracket 12. Moreover, with the hook portion 89 seated at or near the apex 90, 92 of either groove 86, 88, the first and second top surfaces 66, 78 may each remain visible from a position labial of the bracket 12. Thus, the clinician may visually assess the orientation and/or position of the cross members 56, 58 while manipulating the scaler 14 without having to disengage the hook portion 89 from the groove 86, 88.

It will be appreciated that the first and second grooves 86, 88 may each provide particular advantages for certain teeth. For example, the hook portion 89 may be engaged with the first groove 86 when aligning the bracket 12 on a tooth positioned in the posterior of the patient's mouth, while the hook portion 89 may be engaged with the second groove 88 when aligning the bracket 12 on a tooth positioned in the anterior of the patient's mouth. Such selections may provide convenient access to the respective groove 86, 88 and/or optimal transfer of force via the scaler 14, or other benefits which may be readily apparent. However, the hook portion 89 may be engaged with either groove 86, 88 depending on the particular application and the clinician's preference, for example. In some cases, the clinician may initially select one of the grooves 86, 88 for engagement with the hook portion 89 and adjust the insert 10 thereby, disengage the hook portion 89 from the selected groove 86, 88, and then engage the other of the grooves 86, 88 with the hook portion 89 for further adjustment of the insert 10. In any event, the first and second grooves 86, 88 provide the clinician with a variety of options for engaging the hook portion 89 of the scaler 14.

Once the bracket 12 is properly aligned (e.g., positioned and/or oriented relative to the tooth T as desired), the orthodontic bracket 12 may be adhered to the tooth T. For example, a surface of the bracket 12 such as the lingual side 20 (e.g., the rear surface of the pad 32) and/or the tooth T may be at least partially coated with an adhesive, and a force may be applied to the insert 10 via the engagement of the hook portion 89 with either groove 86, 88 in the direction of the base surface 34 of the archwire slot 16 to maintain the bracket 12 in position while the adhesive cures. For example, the hook portion 89 may be engaged with the first groove 86 and manually pressed toward the base surface 34 by the clinician. While this occurs, the gap 98 between the first cross member 56 and the base surface 34 prevents the first cross member 56 from contacting the base surface 34 and may thereby protect the base surface 34 from damage under from forceful application of the scaler 14.

After the adhesive has cured, the scaler 14 may be disengaged from the groove 86, 88 and the insert 10 may be removed from the orthodontic bracket 12. To that end, the hook portion 89 of the scaler 14 may be at least partially inserted into the gap 98 between the first cross member 56 and the base surface 34 of the archwire slot 16, and a force may be applied to the first bottom surface 68 via the hook portion 89 in a direction generally away from the base surface 34 sufficient to overcome the interference fit between the insert 10 and the bracket 12 to dislodge the insert. The orthodontist or other clinician may then manually remove the insert 10 from the patient's mouth.

In one embodiment, after the insert 10 has been removed from the orthodontic bracket 12, the insert 10 may be removably secured to a second orthodontic bracket (not shown) for aligning the second orthodontic bracket to a second tooth. In this regard, the illustrated insert 10 may be suitable for use with multiple orthodontic brackets of similar or differing designs for attachment to the various teeth of a patient's mouth. In other words, the illustrated insert 10 may be compatible with a variety of bracket designs. To that end, the first cross member 56 may be sized and configured to provide an interference fit with archwire slots of various brackets. In addition or alternatively, the second cross member 58 may be sized and configured to provide an interference fit with occlusal and gingival sides of various brackets.

Referring now to FIGS. 6A-8B, wherein like numerals represent like features, various alternative exemplary orthodontic bracket axis indicators or inserts 110, 210, 310 are provided. The inserts 110, 210, 310 are each substantially similar to the insert 10 described above, with the primary differences pertaining to scale or dimensions of the various features of the inserts 110, 210, 310, and/or the particular curvatures of the second cross members 158, 258, 358. Thus, while any of the illustrated inserts 10, 110, 210, 310 may be compatible with any orthodontic bracket, certain inserts 10, 110, 210, 310 may be tailored for optimal performance with particular brackets designed for particular teeth. For example, the insert 110 shown in FIGS. 6A and 6B may be tailored for optimal performance with brackets for all teeth other than cuspids and lower anterior teeth. The insert 210 shown in FIGS. 7A and 7B may be tailored for optimal performance with brackets for cuspids. The insert 310 shown in FIGS. 8A and 8B may be tailored for optimal performance with brackets for lower anterior teeth.

Figure 9:
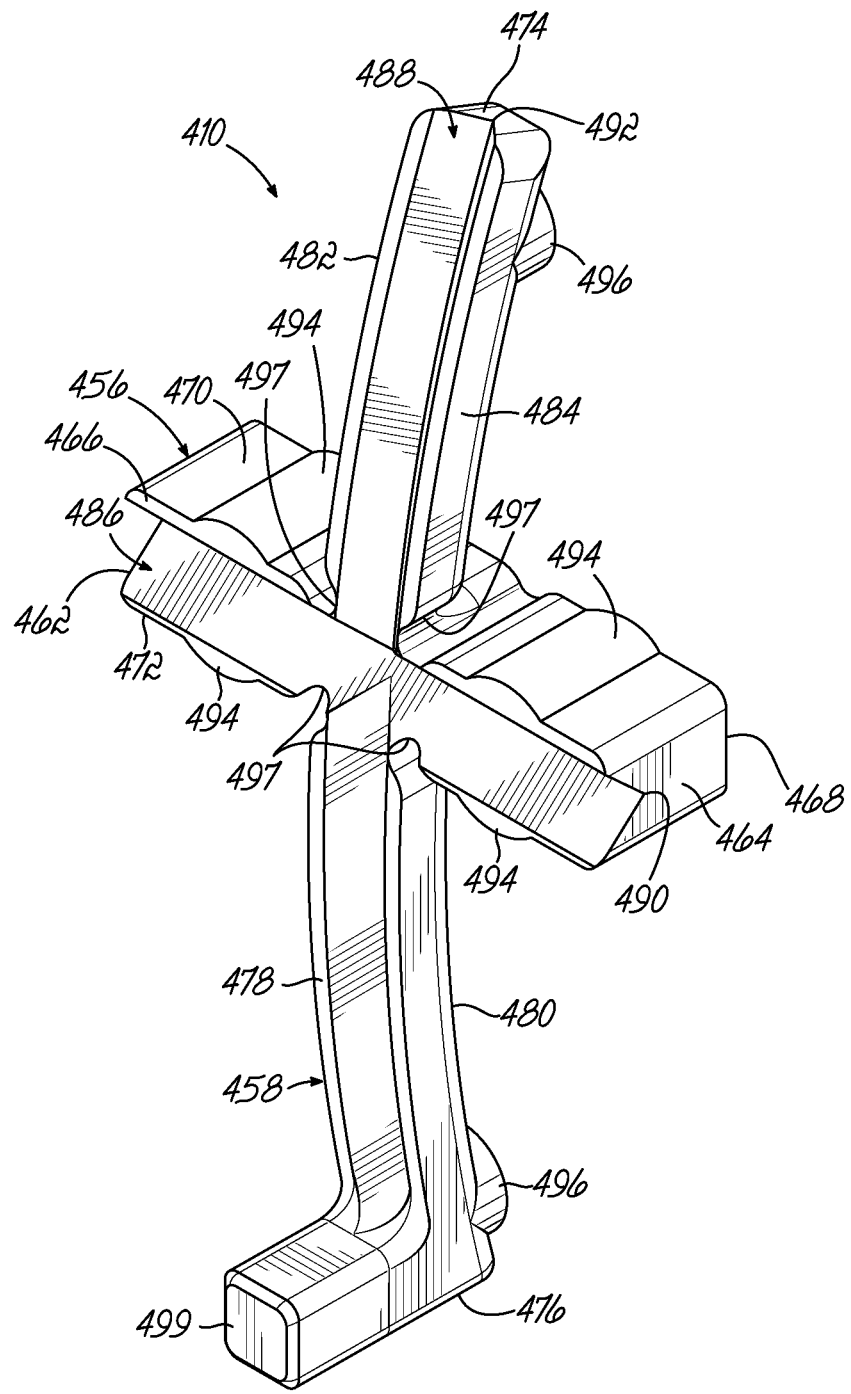
FIG. 9 is a perspective view of an alternative exemplary orthodontic bracket axis indicator, in accordance with an aspect of the invention.

Referring now to FIG. 9, wherein like numerals represent like features, an alternative exemplary orthodontic bracket axis indicator or insert 410 includes a tab 499 arranged on the second cross member 458. As shown, the tab 499 extends generally labially from the third end 476 of the insert 410. The tab 499 may be gripped by the clinician to substitute or supplement manipulation of the hook portion 89 of the scaler 14 to align the bracket 12 on the tooth T and/or to remove the insert 410 from the bracket 12.

Therefore, the inserts 10, 110, 210, 310, 410 may assist the clinician in properly aligning a bracket 12 on a patient's tooth T without the need for messy paints and, may be reusable with the same bracket or a variety of other brackets and/or bracket designs. When releasably secured to the bracket 12, both cross members 56, 58, 156, 158, 256, 258, 356, 358, 456, 458 of the inserts 10, 110, 210, 310, 410 may remain readily visible while the clinician manipulates a sickle scaler 14 engaged with a groove 86, 88, 186, 188, 286, 288, 386, 388, 486, 488 thereof to adjust the orientation and/or position of the bracket 12 relative to the tooth T. The inserts 10, 110, 210, 310, 410 may protect the bracket 12 from being damaged by the sickle scaler 14, and may provide access to the insert 10, 110, 210, 310, 410 between the insert 10, 110, 210, 310, 410 and the base surface 34 of the archwire slot 16 for the sickle scaler 14 to assist in removal of the insert 10, 110, 210, 310, 410 from the bracket 12 without the need for chemicals or other tools. Thus, utilizing the inserts 10, 110, 210, 310, 410 when aligning the bracket 12 on the tooth T may provide improved satisfaction for both the clinician and the patient.

While the present invention has been illustrated by the description of one or more embodiments thereof, and while the embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method and illustrative examples shown and described. Accordingly, departures may be made from such details without departing from the scope or spirit of the general inventive concept.

What is claimed is:

1. An orthodontic bracket axis indicator for use with an orthodontic bracket including a long slot intersecting with an archwire slot having a base surface and first and second opposed slot surfaces extending from the base surface, the indicator comprising:
   an insert including first and second elongate cross members having first and second top surfaces, respectively, that each define a length and a width, wherein the width is less than the length, the first and second elongate cross members being arranged generally perpendicular to each other such that, when viewed from above, the insert has a generally cruciform shape,
   wherein first and second grooves extend along the first and second top surfaces of the first and second cross members, respectively, each defining a length and a width, wherein the width is less than the length, the first and second grooves arranged so that a length direction of each groove extends along a length direction of its respective elongate cross member,
   wherein the first and second grooves are each configured to receive an orthodontic tool,
   wherein the first cross member is configured to be received by the archwire slot and the second cross member is configured to be received by the long slot in order to provide an interference fit between the insert and the orthodontic bracket,
   wherein the first cross member is configured to be spaced apart from the base surface of the archwire slot by a gap when received by the archwire slot, and
   wherein the second cross member is configured to operatively engage a surface of the orthodontic bracket in order to provide the gap.

2. The orthodontic bracket axis indicator of claim 1, wherein at least one of the first or second grooves is generally V-shaped.

3. The orthodontic bracket axis indicator of claim 1, wherein the gap is sized to prevent the first cross member from contacting the base surface of the archwire slot when the orthodontic tool is received by one of the first or second grooves and applies a force thereto in a direction toward the base surface.

4. The orthodontic bracket axis indicator of claim 1 wherein the gap is sized to receive the orthodontic tool such that the orthodontic tool may apply a force to the first cross member in a direction away from the base surface in order to remove the insert from the orthodontic bracket.

5. The orthodontic bracket axis indicator of claim 1, wherein the second cross member is configured to operatively engage a surface of the long slot in order to provide the gap.

6. The orthodontic bracket axis indicator of claim 1, wherein the first cross member includes first and second side surfaces opposing the first and second slot surfaces of the archwire slot when received by the archwire slot, and wherein the first cross member includes at least one protrusion extending from at least one of the first or second side surfaces for providing an interference fit between the first cross member and the archwire slot.

7. The orthodontic bracket axis indicator of claim 1, wherein the second cross member includes at least one bottom surface opposite the second top surface, and wherein the second cross member includes at least one protrusion extending from the at least one bottom surface for providing an interference fit between the second cross member and a side surface of the orthodontic bracket.

8. The orthodontic bracket axis indicator of claim 1, wherein the insert comprises at least one of an edible material or a dissolvable material.

9. A method of aligning an orthodontic bracket on a tooth, the orthodontic bracket including a long slot intersecting with an archwire slot having a base surface and first and second opposed slot surfaces extending from the base surface, the method comprising:
   removably securing an insert to the orthodontic bracket, wherein a first cross member of the insert is received by the archwire slot and a second cross member of the insert is received by the long slot to provide an interference fit between the insert and the orthodontic bracket, and wherein the first and second elongate cross members are arranged generally perpendicular to each other such that, when viewed from above, the insert has a generally cruciform shape, wherein the first cross member is spaced apart from the base surface of the archwire slot by a gap when received by the archwire slot, and wherein the second cross member operatively engages a surface of the orthodontic bracket in order to provide the gap;
   selecting a first selected groove from first and second grooves provided on top surfaces of the first and second cross members, respectively, the top surfaces having a length and a width, wherein the width is less than the length, the first and second grooves extending along the top surfaces of the first and second cross members, the grooves having a length and a width, wherein the width is less than the length, the first and second grooves arranged so that a length direction of each groove extends along a length direction of its respective elongate cross member, and the first and second grooves each being configured to receive an orthodontic tool;
   engaging a portion of an orthodontic tool with the first selected groove;
   manipulating the orthodontic tool to adjust an orientation of the orthodontic bracket on the tooth via the engagement of the portion of the orthodontic tool with the first selected groove;
   adhering the orthodontic bracket to the tooth; and
   removing the insert from the orthodontic bracket.

10. The method of claim 9, wherein the step of adhering the orthodontic bracket to the tooth includes applying a force to the insert in the direction of the base surface of the archwire slot, and wherein the gap provided between the first cross member and the base surface prevents the first cross member from contacting the base surface.

11. The method of claim 9, wherein the step of removing the insert from the orthodontic bracket includes inserting a portion of the orthodontic tool into the gap provided between the first cross member and the base surface of the archwire slot and applying a force to the insert in a direction away from the base surface via the orthodontic tool.

12. The method of claim 9, wherein the step of manipulating the orthodontic tool includes visually assessing at least one of an orientation or a position of at least one of the first or second cross members relative to the tooth.

13. The method of claim 9, further comprising removably securing the insert to a second orthodontic bracket.

14. The method of claim 9, further comprising prior to the step of adhering the orthodontic bracket to the tooth:
- selecting a second selected groove from the first and second grooves;
- engaging a portion of an orthodontic tool with the second selected groove; and
- manipulating the orthodontic tool to adjust an orientation of the orthodontic bracket on the tooth via the engagement of the portion of the orthodontic tool with the second selected groove.

* * * * *